(12) United States Patent
Toglia et al.

(10) Patent No.: US 9,091,288 B2
(45) Date of Patent: Jul. 28, 2015

(54) SPLICE BLOCK ASSEMBLIES

(71) Applicant: AGS Stainless, Inc., Bainbridge Island, WA (US)

(72) Inventors: Michael Toglia, Seattle, WA (US); Angelo Toglia, Bainbridge Island, WA (US); Gary Giffin, Kingston, WA (US); Dale Cavanaugh, Bremerton, WA (US); Jason Gregson, Bremerton, WA (US)

(73) Assignee: AGS Stainless, Inc., Bainbridge Island, WA (US)

( * ) Notice: Subject to any disclaimer, the term of this patent is extended or adjusted under 35 U.S.C. 154(b) by 126 days.

(21) Appl. No.: 13/972,807

(22) Filed: Aug. 21, 2013

(65) Prior Publication Data
US 2015/0056007 A1    Feb. 26, 2015

(51) Int. Cl.
*E04F 11/18* (2006.01)
*F16B 7/04* (2006.01)

(52) U.S. Cl.
CPC .................................... *F16B 7/042* (2013.01)

(58) Field of Classification Search
CPC . Y10T 403/45; Y10T 403/55; Y10T 403/555; F16B 7/0413; F16B 7/042; F16B 7/0446; E04F 11/18; E04F 11/1808; E04F 11/1836; E04F 11/184
See application file for complete search history.

(56) References Cited

U.S. PATENT DOCUMENTS 3,484,830 A * 12/1969 Wagner et al. ................. 285/397
4,369,000 A *  1/1983 Egnew ............................ 403/13
5,102,254 A *  4/1992 Yeh .............................. 403/174
5,409,122 A *  4/1995 Lazarus ........................ 211/186
5,893,675 A *  4/1999 Lange ........................... 403/297

FOREIGN PATENT DOCUMENTS

DE    296 05 722    *  6/1996    .............. E04F 11/18
EP    0 812 761     * 12/1997    .............. B62K 25/04

OTHER PUBLICATIONS

Aecinfo.com Listing: "Stainless," downloaded on Aug. 22, 2013 from http://www.aecinfo.com/1/resourcefile/52/01/15/stainless_railing_brochure.pdf.
Aluminum-rails.com Listing: "Lowe's Corporate HQ," downloaded on Aug. 22, 2013 from www.aluminum-rails.com/catalogs/lowes-corporate-hq-2009.pdf.
Aluminum-rails.com Listing: "Structural Glass Railing Designs," downloaded on Aug. 22, 2013 from www.aluminum-rails.com/catalogs/structural-glass-2010.pdf.
Icrailing.com Listing: "Coupler," downloaded on Aug. 22, 2013 from http://icrailing.com/components/coupler/.
Icrailing.com Listing: "Rods," downloaded on Aug. 22, 2013 from http://icrailing com/components/rods/.
Inlinedesign.us Listing: "Stainless Steel Square Bar 1/2" and 8.20 feet Long" downloaded on Aug. 22, 2013 from http://inlinedesign.us/products/stainless-steel-square-bar-half-inch-and-8-dot-20-feet-long.
Inlinedesign.us Listing: "Stainless Steel Bar Holder Square," downloaded on Aug. 22, 2013 from http://inlinedesign.us/products/stainless-steel-bar-holder-square.

(Continued)

*Primary Examiner* — Michael P Ferguson

(57) ABSTRACT

Expandable splice blocks can be configured to mechanically couple a first rod to a second rod. Expandable splice blocks can include a top plate and a bottom plate. Bottom plates can include a first side coupled to a second side by a neck.

19 Claims, 14 Drawing Sheets

(56) References Cited

OTHER PUBLICATIONS

Inlinedesign.us Listing: "Stainless Steel Square Bar Connector Pivot," downloaded on Aug. 22, 2013 from http://inlinedesign.us/products/stainless-steel-square-bar-connector-pivot.

Inlinedesign.us Listing: "Bar Parts," downloaded on Aug. 22, 2013 from http://inlinedesign.us/t/bar-parts.

Stainless-railing.com Listing: "Stainless Handrails & Railings," downloaded on Aug. 22, 2013 from http://www.stainless-railing.com/.

Wagnercompanies.com Listing: "Double-Lock Splice Lock," downloaded on Aug. 22, 2013 from http://www.wagnercompanies.com/Double_Splice-Lock_Connector.aspx.

Wagnercompanies.com Listing: "Single Lock Splice-Lock," downloaded on Aug. 22, 2013 from http://www.wagnercompanies.com/Single_Splice-Lock_Mechanical_Connector.aspx.

Youtube.com Video: "Wagner Companies Splice Lock," downloaded on Aug. 22, 2013 from http://www.youtube.com/watch?v=eQVGQ6AnPS0.

* cited by examiner ized shipping methods such as United Parcel Service,
SPLICE BLOCK ASSEMBLIES

BACKGROUND

1. Field

Various embodiments disclosed herein relate to splicing assemblies. Certain embodiments relate to splice blocks configured to mechanically couple rods.

2. Description of Related Art

Rods can be useful in many construction activities. Metal rods are often used in buildings, railing systems, and various vehicles. When rods are not long enough, a coupling system can attach an end of one rod to an end of another rod.

Railing systems can prevent people from falling from decks, stairs, and balconies. Railing systems often require rods that are longer than can be cost effectively shipped using standard shipping methods such as United Parcel Service, Inc. ("UPS") and FedEx Corporation ("FedEx").

The ability to securely couple rods together can be helpful in many situations, including when shipping requirements limit the maximum rod length that a manufacturer can ship to a customer. Coupling systems can enable a manufacturer to ship multiple rod segments that the customer can attach together during construction. Several prior art coupling systems suffer from mechanical fragility or cosmetic drawbacks. Thus, there is a need for a coupling system that securely couples rods in a way that is cosmetically pleasing.

SUMMARY

In some embodiments, an expandable splice block can be configured to mechanically couple a first rod to a second rod. An expandable splice block can include a top flat plate comprising a front surface and a back surface. In some embodiments, expandable splice blocks include a bottom plate comprising a first flat side and a second flat side, which can be coupled by a neck. The first flat side can include a first hole and the second flat side can include a second hole. The first flat side can include a first front surface and the second flat side can include a second front surface. The top flat plate can be detachably coupled to the bottom plate such that the back surface of the top plate faces towards the first front surface of the first flat side and towards the second front surface of the second flat side. In several embodiments, the top plate can be coupled to the bottom plate such that the top plate can be uncoupled from the bottom plate.

In several embodiments, an expandable splice block includes a top plate comprising a front surface and a back surface. Expandable splice blocks can also include a bottom plate comprising a first side and a second side. The first side can be coupled to the second side by a neck. In some embodiments, the first side includes a first threaded hole and the second side includes a second threaded hole. The first side can include a first front surface and a first back surface. The second side can also include a second front surface and a second back surface. The back surface of the top plate can face towards the first front surface of the first side.

Some expandable splice blocks include a first threaded insert threadably coupled to the first threaded hole. The first threaded insert can be configured to push the top plate away from the first side as the first threaded insert is threaded towards the top plate. Some expandable splice blocks also include a second threaded insert threadably coupled to the second threaded hole. The second threaded insert can be configured to push the top plate away from the second side as the second threaded insert is threaded towards the top plate.

In some embodiments, an expandable splice block system includes a central axis with a left side and a right side. The central axis can be an imaginary reference line. Expandable splice block systems can include a top plate and a bottom plate that includes a first side and a second side. The first side can be coupled to the second side by a neck. The first side can include a first threaded hole located on the left side of the central axis and a second threaded hole located on the right side of the central axis. The second side can include a third threaded hole located on the left side of the central axis and a fourth threaded hole located on the right side of the central axis.

In several embodiments, a first rod includes a first outer surface and a first hollow end portion. The first outer surface can include a first hole located on the left side of the central axis and a second hole located on the right side of the central axis. The first hole and the second hole can extend from the first outer surface into the first hollow end portion. In some embodiments, the first side of the bottom plate can be located inside of the first hollow end portion of the first rod.

In some embodiments, a second rod includes a second outer surface and a second hollow end portion. The second outer surface can include a third hole located on the left side of the central axis and a fourth hole located on the right side of the central axis. The first hole and the second hole can extend from the second outer surface into the second hollow end portion. The second side of the bottom plate can be located inside of the second hollow end portion of the second rod.

Several embodiments include a first threaded insert that extends through at least a portion of the first hole, is threadably coupled to the first threaded hole of the first side of the bottom plate, and presses the top plate away from the bottom plate inside of the first hollow end portion of the first rod. In several embodiments, threaded inserts are configured to create a gap between the top plate and the bottom plate.

Some embodiments include a second threaded insert that extends through at least a portion of the second hole, is threadably coupled to the second threaded hole of the first side of the bottom plate, and presses the top plate away from the bottom plate inside of the first hollow end portion of the first rod.

Several embodiments include a third threaded insert that extends through at least a portion of the third hole, is threadably coupled to the third threaded hole of the second side of the bottom plate, and presses the top plate away from the bottom plate inside of the second hollow end portion of the second rod.

Some embodiments include a fourth threaded insert that extends through at least a portion of the fourth hole, is threadably coupled to the fourth threaded hole of the second side of the bottom plate, and presses the top plate away from the bottom plate inside of the second hollow end portion of the second rod. Several embodiments include one threaded insert, two threaded inserts, three threaded inserts, four threaded inserts, or ten threaded inserts.

BRIEF DESCRIPTION OF THE DRAWINGS

These and other features, aspects, and advantages are described below with reference to the drawings, which are intended to illustrate but not to limit the invention. In the drawings, like reference characters denote corresponding features consistently throughout similar embodiments.

DETAILED DESCRIPTION

Figure 1:
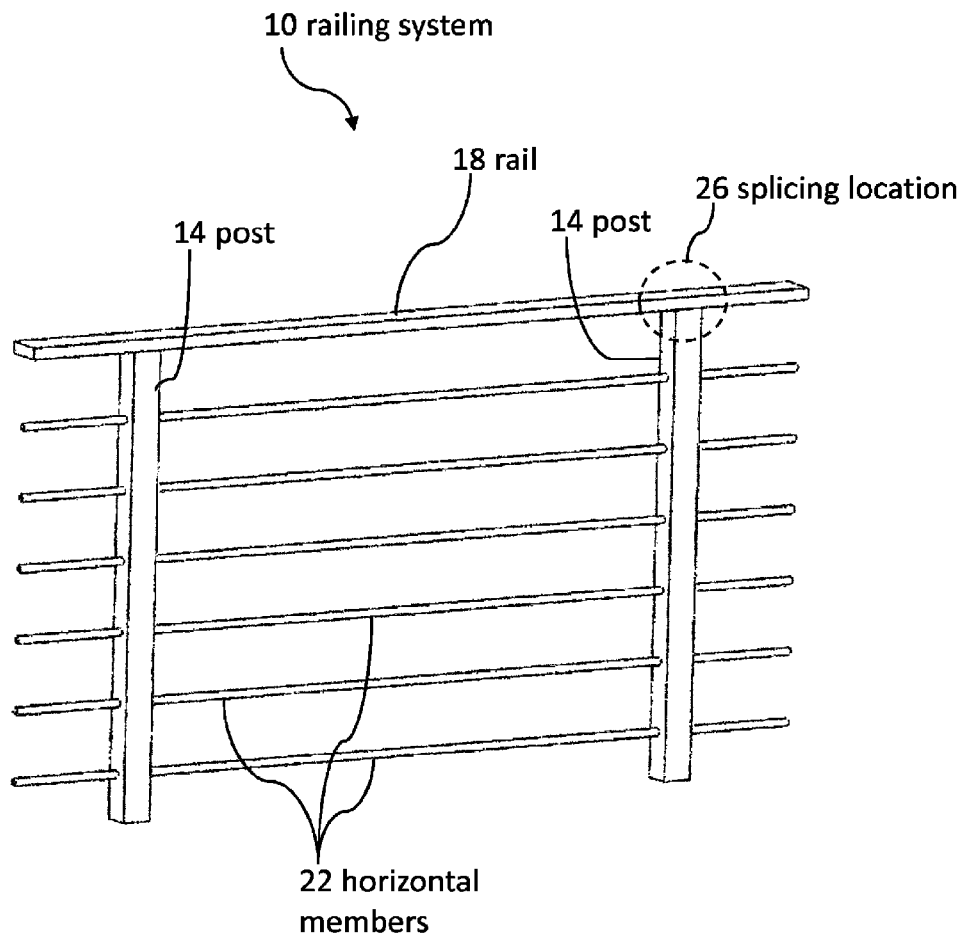
FIG. 1 illustrates a perspective view of a portion of a railing system, according to some embodiments.

Although certain embodiments and examples are disclosed herein, inventive subject matter extends beyond the examples in the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described herein. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein. No feature, benefit, advantage, structure, or step disclosed herein is essential or indispensable.

The drawings illustrate certain embodiments and are not intended to be limiting. The drawings can be semi-diagrammatic and not to scale. For clarity of presentation and discussion, some portions of and/or dimensions in the drawings are shown greatly exaggerated.

FIG. 1 illustrates a perspective view of a portion of a railing system embodiment 10 configured to prevent people, animals, and objects from falling from decks, stairs, and balconies. The railing system 10 can include vertical posts 14 and horizontal rails 18. The rails 18 can be coupled to the tops of posts 14. Some rails 18, such as stairway rails, are not horizontal.

Railing systems can include horizontal members 22, such as cables, rods, and glass panels, to prevent people, animals, and objects from passing between the posts 14. In several embodiments, the horizontal members 22 are coupled to posts 14. Not all of the horizontal members 22 are labeled in FIG. 1 in the interest of clarity.

In some embodiments, rails 18, posts 14, and horizontal members 22 are made from metal, plastic, and/or wood. Some embodiments include plastic rails 18, posts 14, and/or horizontal members 22 colored and/or textured to look like metal or wood.

Rails 18 and posts 14 are examples of rods. As used herein, the term "rod" includes bars of various materials including metal and wood. Rods are often much longer than they are wide. Several splicing assemblies are described herein. Splicing assemblies can be used to mechanically couple rods together. For example, the rail 18 and the posts 14 in FIG. 1 could be too long to enable cost-effective shipping. The manufacturer could ship the rail 18 and/or posts in multiple segments, which could be coupled together at the destination using slicing assemblies.

Figure 2:
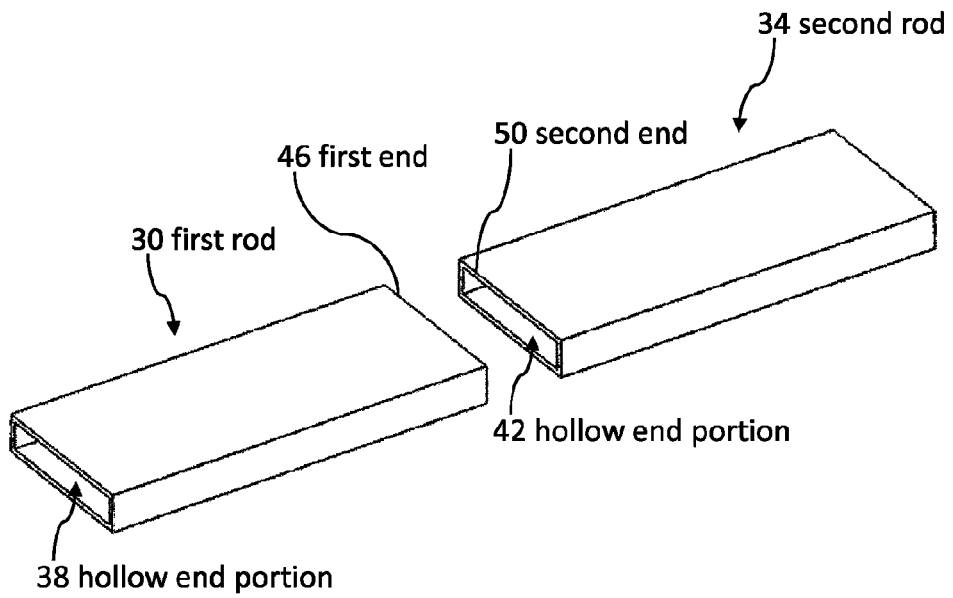
FIG. 2 illustrates a perspective view of a first rod and a second rod before they are mechanically coupled, according to some embodiments.

The dashed circle in FIG. 1 indicates a location 26 where two rod segments are spliced together to form the rail 18. FIG. 2 illustrates a perspective view of a first rod 30 and a second rod 34 before they are mechanically coupled. The lengths of the first rod 30 and the second rod 34 are greatly under-exaggerated in FIG. 2. The first rod 30 can include a hollow end portion 38. The second rod 34 can also include a hollow end portion 42. In some embodiments, a splice block is inserted into hollow end portions to mechanically couple two rods to form one longer rod.

Figure 3:
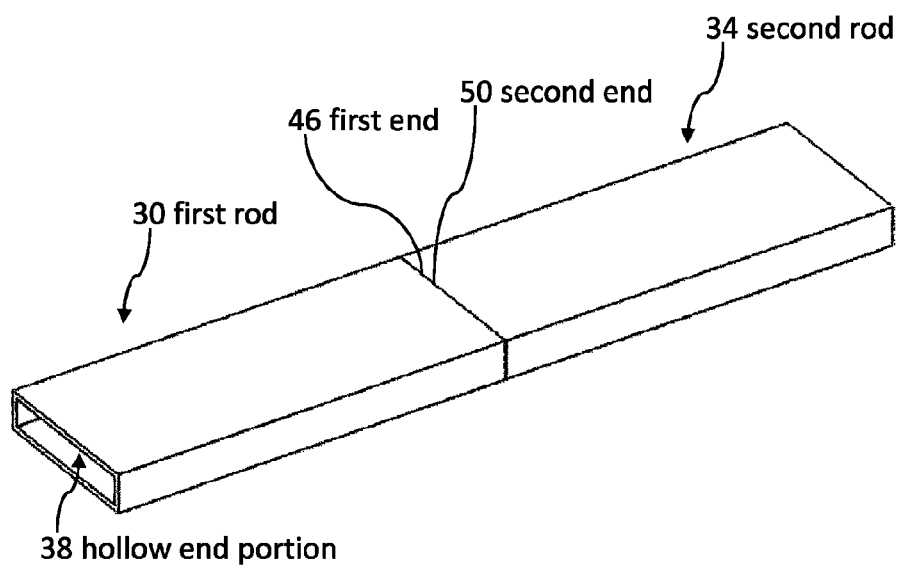
FIG. 3 illustrates a perspective view of the first rod mechanically coupled to the second rod, according to some embodiments.

FIG. 3 illustrates a perspective view of the first rod 30 and the second rod 34 mechanically coupled. A first end 46 of the first rod 30 is spliced to a second end 50 of the second rod 34. The splicing assembly used to mechanically couple the first rod 30 and the second rod 34 is not visible in FIG. 3 because it is hidden inside the first rod 30 and the second rod 34. The hidden state of the splicing assembly can have several cosmetic benefits and can result in a safer railing because there are fewer features that can catch on objects, hands, clothing, or people.

One challenge of mechanically coupling rods is that the joining ends often do not match up perfectly. For example, one rod might be twisted slightly, not be perfectly parallel to the second rod, and/or might have an end that is not exactly rectangular. As a result, people tasked with coupling rods often struggle to join rods. This problem can be particularly arduous when the rods are metal and/or inflexible.

Figure 4:
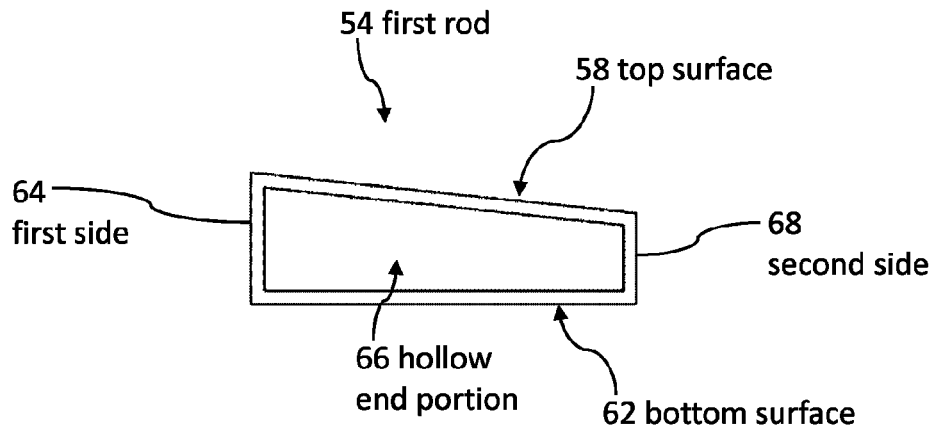
FIG. 4 illustrates a side view of an end of an imperfect rod, according to some embodiments.

FIG. 4 illustrates an end of a first rod 54 (from the perspective of looking directly at the end). The first rod 54 can include a top surface 58 and a bottom surface 62 joined by a first side 64 and a second side 68. The top surface 58 and the bottom surface 62 are not parallel. As a result, mechanically coupling the first rod 54 to another rod will result in a mating imperfection such as an overhang, flared portion, or mismatch.

Figure 5:
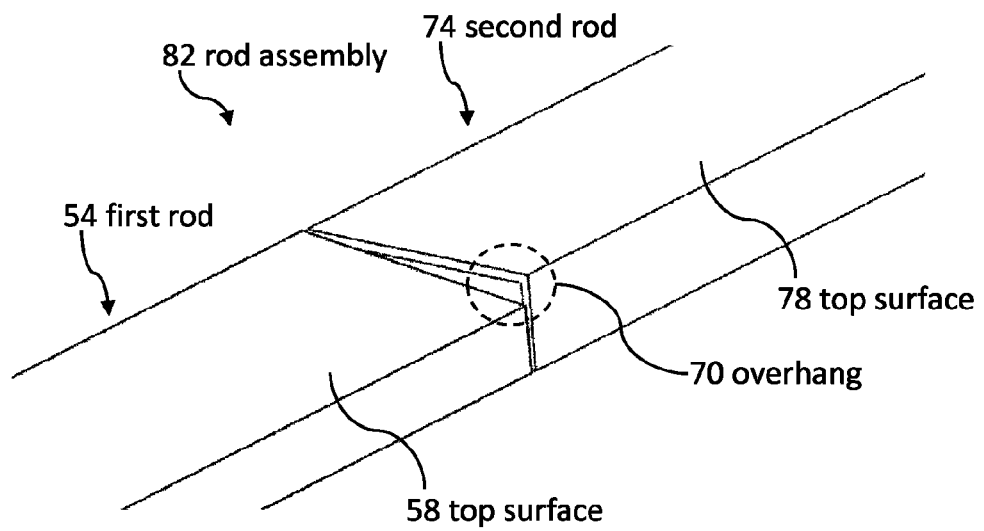
FIG. 5 illustrates a perspective view of an overhang, according to some embodiments.

FIG. 5 illustrates a perspective view of an overhang 70, as indicated by the dashed circle. The overhang 70 is caused by the abnormal shape or orientation of the first rod 54 as it is coupled with a second rod 74. The overhang 70 is located on the top surface of the rod assembly 82, which comprises the first rod 54 and the second rod 74. The top surface of the rod assembly 82 is formed by the top surface 58 of the first rod 54 and the top surface 78 of the second rod 74.

Some expandable splice block systems are capable of eliminating overhangs 70 on top surfaces by aligning top surfaces and moving the effect of the mating imperfection to the bottom surface of the rod assembly. Expandable splice block systems can include a rigid plate configured to force the top surface 58 of the first rod 54 to be coplanar (or approximately coplanar) with the top surface 78 of the second rod 74 while allowing bottom surfaces to be non-coplanar by providing a means of allowing the expandable splice block systems to move to accommodate alignment imperfections on bottom surfaces.

Some expandable splice block systems are capable of eliminating noisy rattling between coupled rods by expanding to fill hollow end portions. The geometries of some hollow end portions can be particularly challenging to fill (in order to eliminate "rattle" and ensure a tight, secure fit between rods). For example, the hollow end portion 66 in FIG. 4 is asymmetrical. Some splice block embodiments are capable of accommodating non-rectangular rod cross sections by allowing portions of the block to rotate and/or move relative to other portions of the block.

Figure 6:
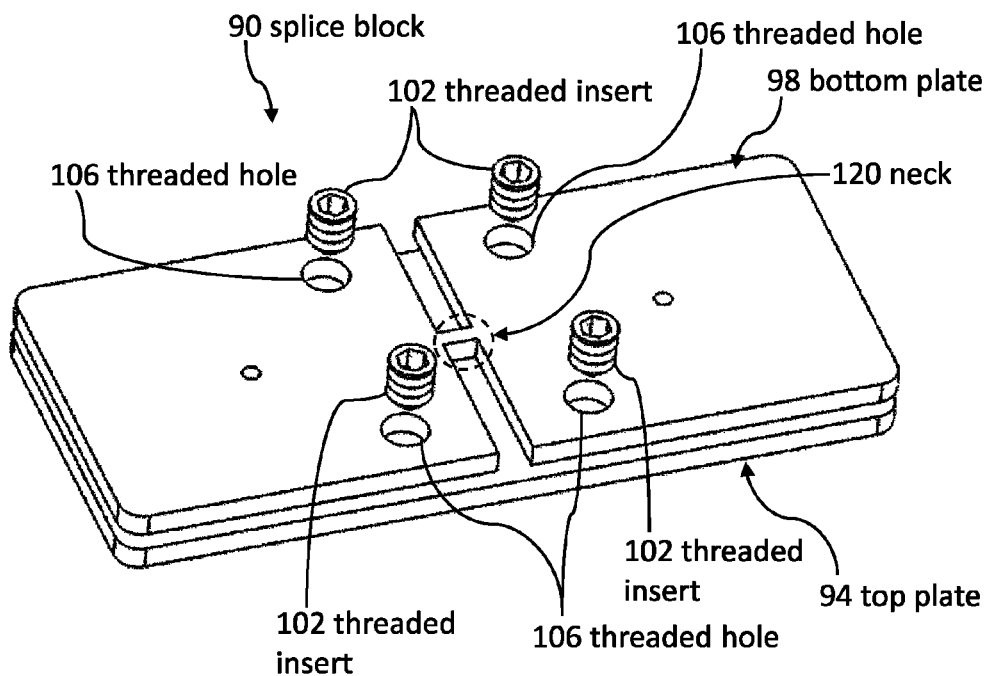
FIG. 6 illustrates a perspective view of an expandable splice block configured to mechanically couple a first rod to a second rod, according to some embodiments.

FIG. 6 illustrates a perspective view of an expandable splice block 90 configured to mechanically couple a first rod to a second rod. The expandable splice block 90 can include a top plate 94 and a bottom plate 98.

The expandable splice block can be configured to push the top plate 94 away from the bottom plate 98. In some embodiments, threaded inserts 102 force the top plate 94 away from the bottom plate 98 as the threaded inserts 102 are rotated such that the threaded inserts 102 move towards the top plate 94. Threaded inserts 102 can include screws, bolts, threaded rods, set screws, socket screws, cap screws, machine screws, shoulder screws, thumb screws, captive fasteners, binding posts, machine table bolts, and any other threaded device. The threaded inserts 102 can be metal. Each threaded insert 102 can be threaded into a threaded hole 106 of the bottom plate 98 or top plate 94.

As used herein, "top" and "bottom" do not indicate that one item is farther from the center of the earth than another item. Thus, a top plate can actually be located below a bottom plate.

Figure 7:
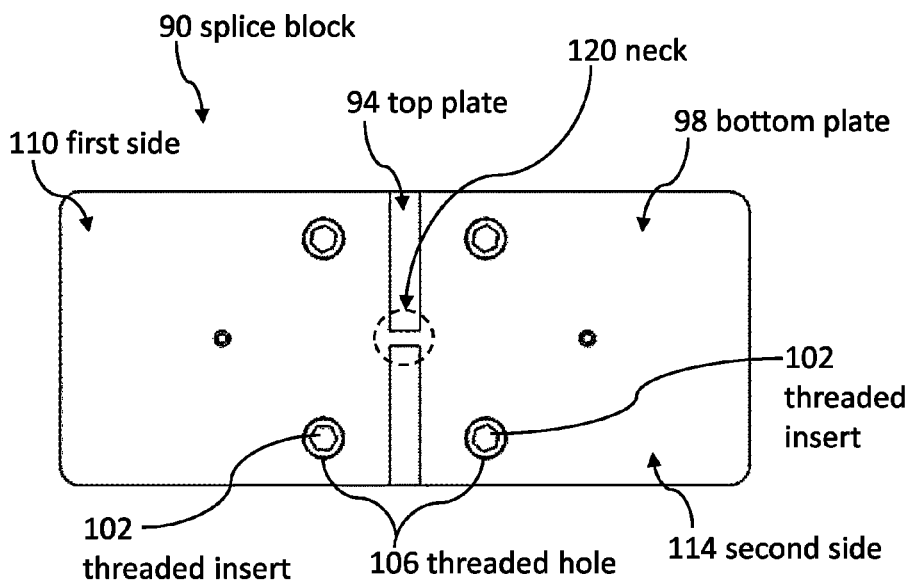
FIG. 7 illustrates a bottom view of the expandable splice block from FIG. 6, according to some embodiments.

FIG. 7 illustrates a bottom view of the expandable splice block 90. Most of the top plate 90 is hidden by the bottom plate 98 in FIG. 7. The bottom plate 98 can include a first side 110 and a second side 114. The first side 110 can be coupled to the second side 114 by a neck 120 (indicated by a dashed circle). The neck 120 can be a relatively narrow bridge that couples the first side 110 to the second side 114. The neck 120 can be a pivot that couples the first side 110 to the second side 114.

Not all of the elements are labeled in each figure to help clarify certain elements in particular figures. For example, not all of the threaded holes 106 and threaded inserts 102 are labeled in FIG. 7. In several embodiments, each side 110, 114 has at least one threaded hole 106.

Figure 8:
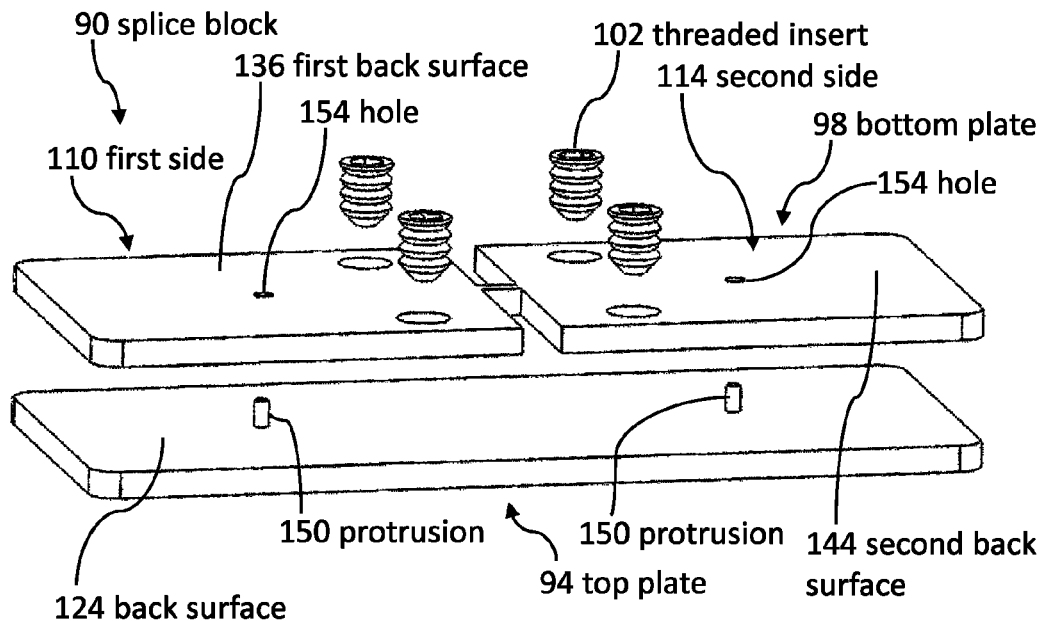
FIGS. 8 and 9 illustrate perspective, exploded views of the expandable splice block from FIG. 6, according to some embodiments.
Figure 9:
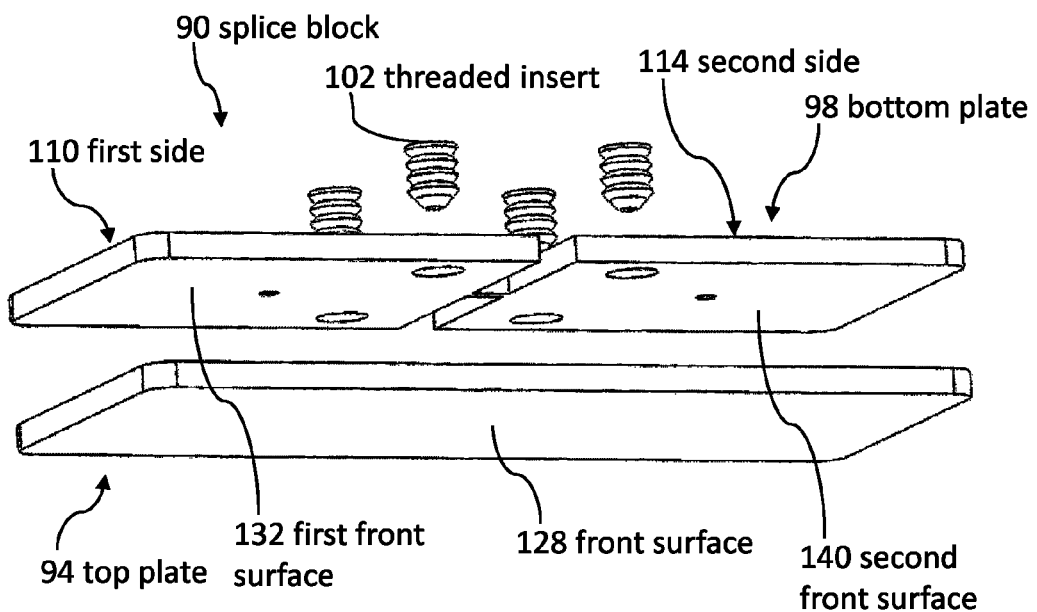

FIGS. 8 and 9 illustrate perspective, exploded views of an expandable splice block 90. The top plate 94 can include a back surface 124 and a front surface 128. The first side 110 of the bottom plate 98 can include a first front surface 132 and a first back surface 136. The second side 114 of the bottom plate 98 can include a second front surface 140 and a second back surface 144. In several illustrated embodiments, the back surface 124 of the top plate 94 can face towards the first front surface 132 of the first side 110. The back surface 124 of the top plate 94 can face towards the second front surface 140 of the second side 114.

The top plate 94 can include at least one protrusion 150 and the bottom plate can include at least one hole 154. The protrusion 150 can be inserted into at least a portion of the hole 154 to limit how far the top plate 94 can slide relative to the bottom plate 98. The protrusion 150 can be cylindrical or any other shape. The protrusion 150 can protrude from one plate towards another plate. The protrusion 150 can protrude perpendicularly relative to the top plate 94 and/or the bottom plate 98. The hole 154 can be cylindrical or any other shape. In some embodiments, the bottom plate 98 has protrusions and the top plate 94 has features configured to interact with the protrusions to limit relative movement between the bottom plate 98 and the top plate 94.

In some embodiments, each side of the bottom plate 98 is substantially flat such that the first back surface 136 lies within a first set of two parallel planes 0.05 inches apart, 0.1 inches apart, or 0.15 inches apart; the second back surface 144 lies within a second set of two parallel planes 0.05 inches apart, 0.1 inches apart, or 0.15 inches apart; the first front surface 132 lies within a third set of two parallel planes 0.05 inches apart, 0.1 inches apart, or 0.15 inches apart; and/or the second front surface 140 lies within a fourth set of two parallel planes 0.05 inches apart, 0.1 inches apart, or 0.15 inches apart. In some embodiments, the first side 110 is oriented differently than the second side 114 (e.g., the first side 110 can be oriented at an angle relative to the second side 114).

Figure 10:
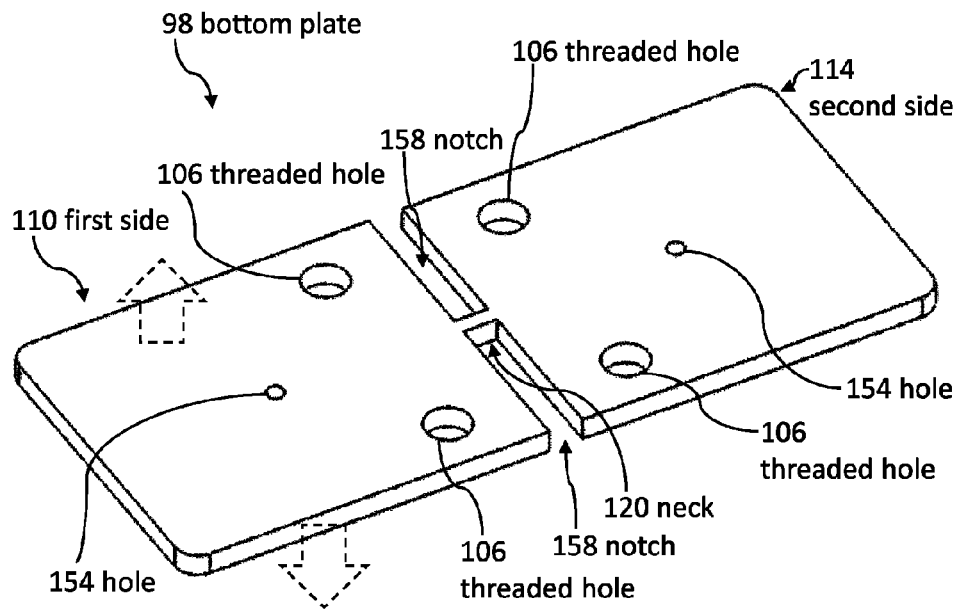
FIG. 10 illustrates a perspective view of a bottom plate, according to some embodiments.

FIG. 10 illustrates a perspective view of a bottom plate 98. The neck 120 can be formed by two notches 158 between the first side 110 and the second side 114. The notches 158 can extend inward between the first side 110 and the second side 114. The neck 120 can be configured to deform to enable the first side 110 to rotate at least three degrees relative to the second side 114. In some embodiments, the neck 120 is deformable to enable the first side 110 to rotate at least three degrees relative to the second side 114 and/or less than 180 degrees relative to the second side 114; at least 10 degrees relative to the second side 114 and/or less than 90 degrees relative to the second side 114; or at least 15 degrees relative to the second side 114 and/or less than 60 degrees relative to the second side 114.

Dashed arrows in FIG. 10 illustrate an embodiment of how the first side 110 can rotate relative to the second side 114. For example, if the second side 114 is held in place and forces are applied to the first side 110 in the directions indicated by the dashed arrows, the neck 120 can move (e.g., deform) to enable the first side 110 to move relative to the second side 114. The deformation can be plastic deformation or elastic deformation.

Figure 11:
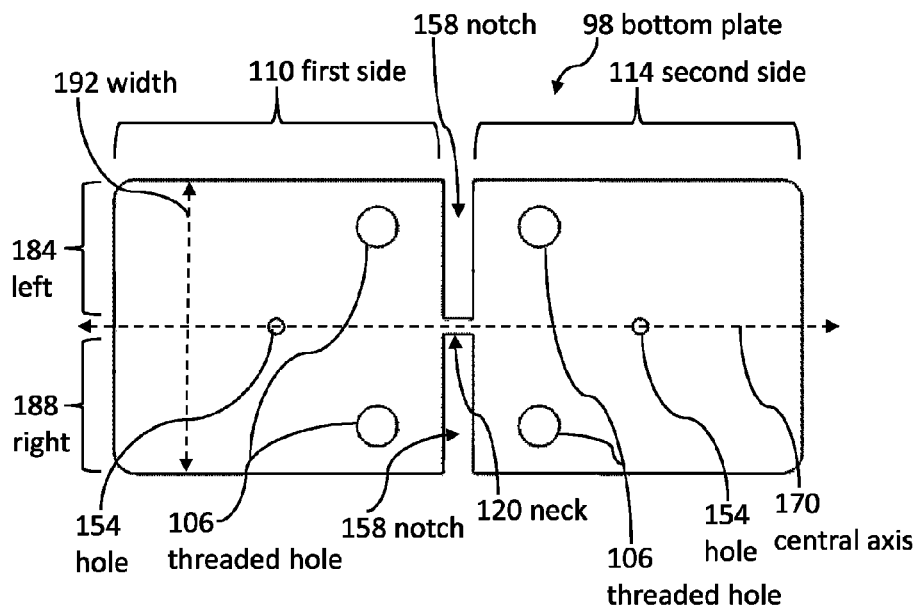
FIG. 11 illustrates a top view of the bottom plate from FIG. 10, according to some embodiments.

FIG. 11 illustrates a top view of a bottom plate 98. A central axis 170 extends from the middle of the first side 110 to the middle of the second side 114. As used herein, "central axis" refers to a reference line and does not necessarily imply rotation about the central axis or symmetry about the central axis. The central axis 170 (i.e., a reference line) is indicated by a dashed line in FIG. 11. In the embodiment illustrated in FIG. 11, the central axis 170 runs through at least a portion of the neck 120. In some embodiments, the central axis 170 runs through the middle of the neck 120. The central axis 170 defines horizontal. For example, the arrows on the central axis 170 indicate horizontal movement in each direction.

The bottom plate 98 can include a left side 184 and a right side 188. The bottom plate 98 can include threaded holes 106 on the left side 184 and threaded holes 106 on the right side 188. In some embodiments, the first side 110 includes a threaded hole 106 on the left side 184 and a threaded hole 106 on the right side 188. In several embodiments, the second side 114 includes a threaded hole 106 on the left side 184 and a threaded hole on the right side 188. Having threaded holes 106 on each side of the central axis 170 can enable the threaded inserts 102 (shown in FIG. 6) to provide leverage relative to the central axis 170 to force the neck 120 to allow the first side 110 to rotate relative to the second side 114 when the first side 110 is located inside of a first rod and the second side 114 is located inside of a second rod.

The width 192 of various portions of the bottom plate 98 can be measured along a top surface in a direction perpendicular to the central axis 170. In some embodiments, the first side 110 comprises a first maximum width, the second side 114 comprises a second maximum width, and the neck 120 comprises a third maximum width. In several embodiments, the first maximum width is more than four times as large as the third maximum width, more than seven times as large as the third maximum width, more than ten times as large as the third maximum width, or more than fourteen times as large as the third maximum width. In some embodiments, the first maximum width is within plus or minus 5% of the size of the second maximum width, within plus or minus 10% of the size of the second maximum width, or within plus or minus 30% of the size of the second maximum width.

Figure 12:
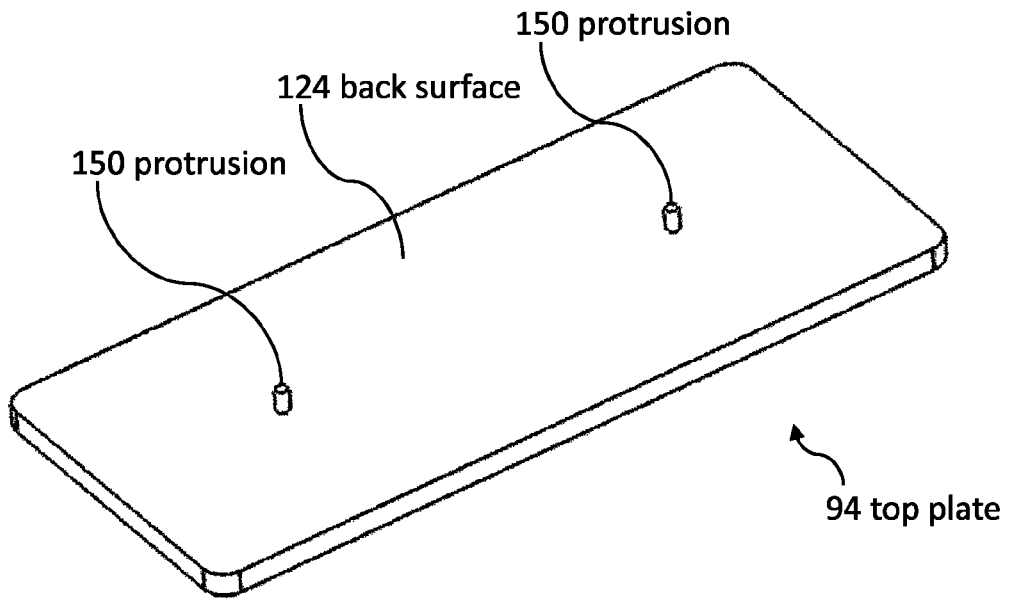
FIG. 12 illustrates a perspective view of a top plate, according to some embodiments.
Figure 13:
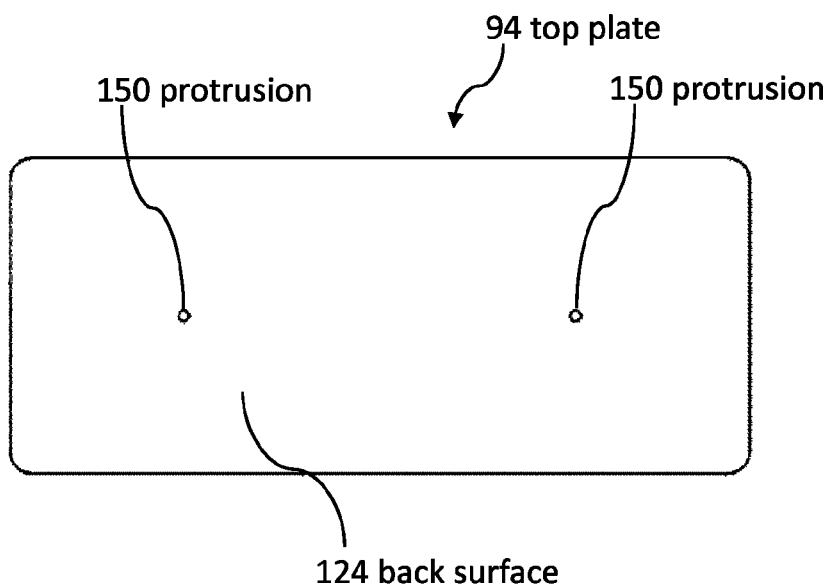
FIG. 13 illustrates a bottom view of the top plate from FIG. 12, according to some embodiments.

FIG. 12 illustrates a perspective view of a top plate 94. FIG. 13 illustrates a bottom view of the top plate 94. The top plate 94 can be rectangular (even if the corners of the top plate 94 are rounded).

Referring now to FIGS. 11 and 12, the length of various portions of the bottom plate 98 and the lengths of various portions of the top plate 94 (shown in FIG. 12) can be measured along a top surface in a direction parallel to the central axis 170. In some embodiments, the top flat plate has a first maximum length and a first maximum width, and the bottom plate has a second maximum length and a second maximum width. In several embodiments, the first maximum width is within plus or minus 5% of the second maximum width; within plus or minus 10% of the second maximum width; or within plus or minus 15% of the second maximum width. In several embodiments, the first maximum length is within plus or minus 5% of the second maximum length; within plus or minus 10% of the second maximum length; or within plus or minus 15% of the second maximum length. In some embodiments, the neck 120 has a third maximum width and the third maximum width is less than 10% of the first maximum width; less than 20% of the first maximum width; or less than 35% of the first maximum width.

The protrusion 150 can be configured to enter into at least a portion of the hole 154 to form a movement control assembly to limit horizontal movement of the bottom plate relative to the top plate. Movement control assemblies can include diverse geometries.

The top plate 94 can be substantially flat such that the front surface 128 (shown in FIG. 9) lies within a first set of two parallel planes 0.1 inches apart; the back surface 124 lies within a second set of two parallel planes 0.1 inches apart; and the first set is parallel to the second set. In some embodiments, the front surface 128 of the top plate is substantially flat such that the front surface 128 lies within two parallel planes 0.05 inches apart, 0.1 inches apart, or 0.2 inches apart. In some embodiments, portions of the top plate 94 and portions of the bottom plate 98 are not flat.

Figure 14:
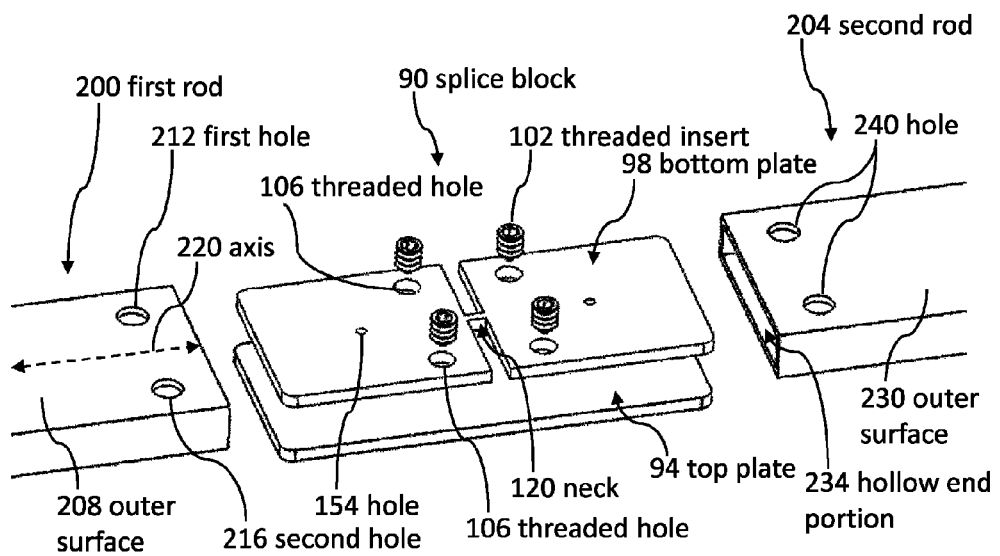
FIGS. 14 to 19 illustrate perspective views at various assembly stages, according to some embodiments.

FIG. 14 illustrates a perspective view of an expandable splice block 90 prior to assembly in a first rod 200 and a second rod 204. The expandable splice block 90 includes four threaded inserts 102 and four threaded holes 106 (although not all of the elements in FIG. 14 are labeled in the interest of clarifying other elements).

The first rod 200 can include a first outer surface 208 and a first hollow end portion. The first outer surface 208 can include a first hole 212 located on the left side of a central axis 220 and a second hole 216 located on the right side of the central axis 220. The first hole 212 and the second hole 216 can extend from the first outer surface 208 into the first hollow end portion (e.g., 270 in FIG. 20).

A second rod 204 can include a second outer surface 230 and a second hollow end portion 234. The second rod 204 can include holes 240 configured to couple with threaded inserts 102.

Figure 15:
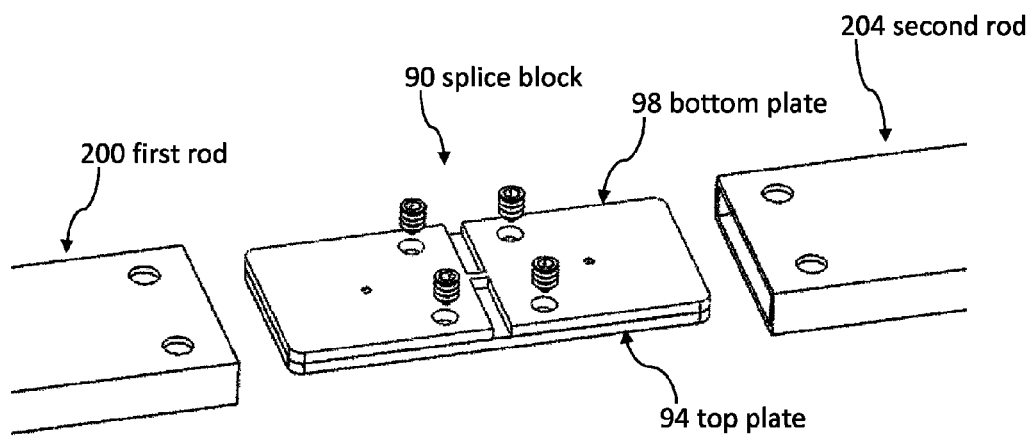

FIG. 15 illustrates a perspective view of the bottom plate 98 coupled to (e.g., resting on) the top plate 94 (e.g., prior to inserting the plates 94, 98 into the rods 200, 204). The bottom plate 98 can have approximately the same outer dimensions as the top plate 94. In some embodiments, the plates 94, 98 are between 0.05 inches and 0.35 inches thick.

Figure 16:
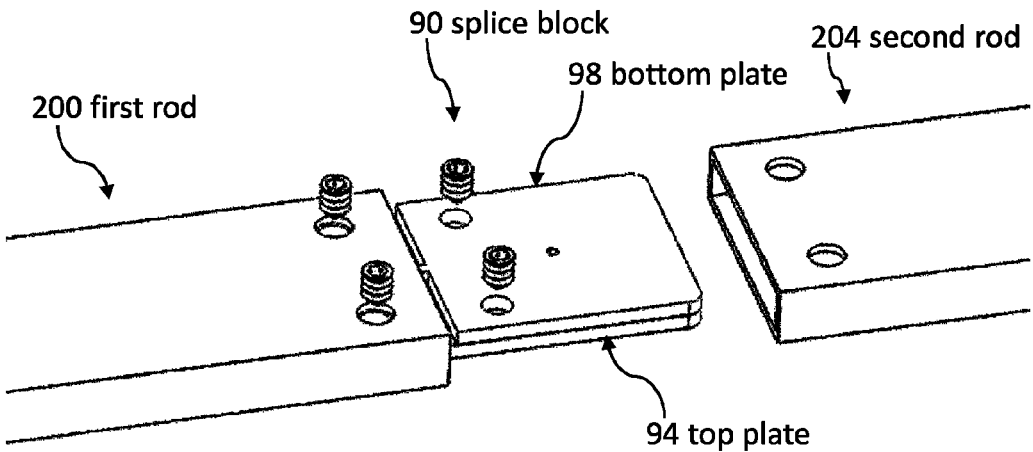

FIG. 16 illustrates a perspective view of the first side of the bottom plate 98 and approximately half of the top plate 94 located inside of a hollow portion of the first rod 200. A hollow portion can be a cavity and/or a hole.

Figure 17:
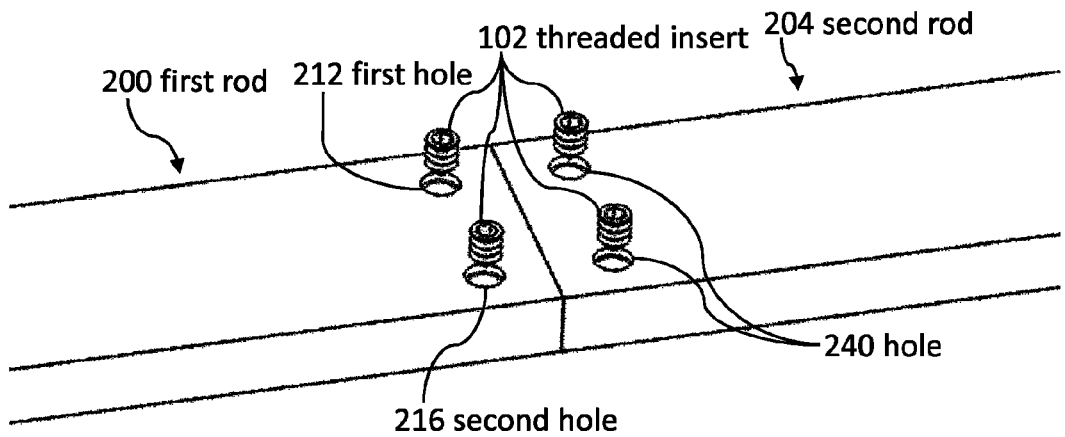

FIG. 17 illustrates a perspective view of the second side of the bottom plate 98 and approximately half of the top plate 94 located inside of a hollow portion of the second rod 204. The splice block 90 is hidden by the first rod 200 and the second rod 204 in FIG. 17 because the splice block 90 is located inside of the first rod 200 and the second rod 204. The threaded inserts 102 have not been passed through holes (e.g., 212, 216, 240 in FIG. 14) or threaded into threaded holes of the bottom plate (not shown).

Figure 18:
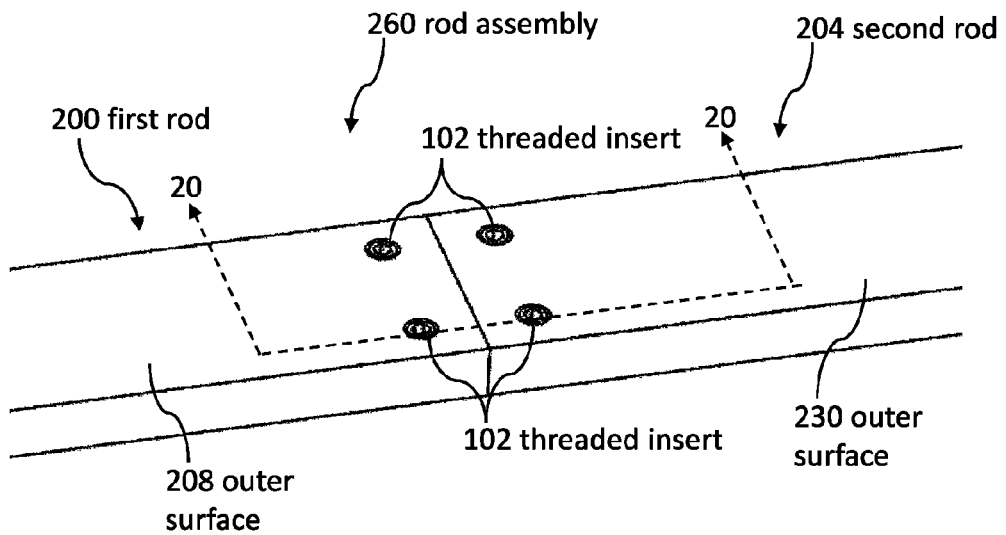

FIG. 18 illustrates a perspective view of the first rod 200 mechanically coupled to the second rod 204 after the threaded inserts 102 have been fully threaded into the assembly. The top plate 94 and the bottom plate 98 (shown in FIG. 16) are hidden inside of a first hollow end portion of the first rod 200 and inside a second hollow end portion of the second rod 204. The outer surface 208 is the bottom surface of the first rod 200. The outer surface 230 is the bottom surface of the second rod 204.

Figure 19:
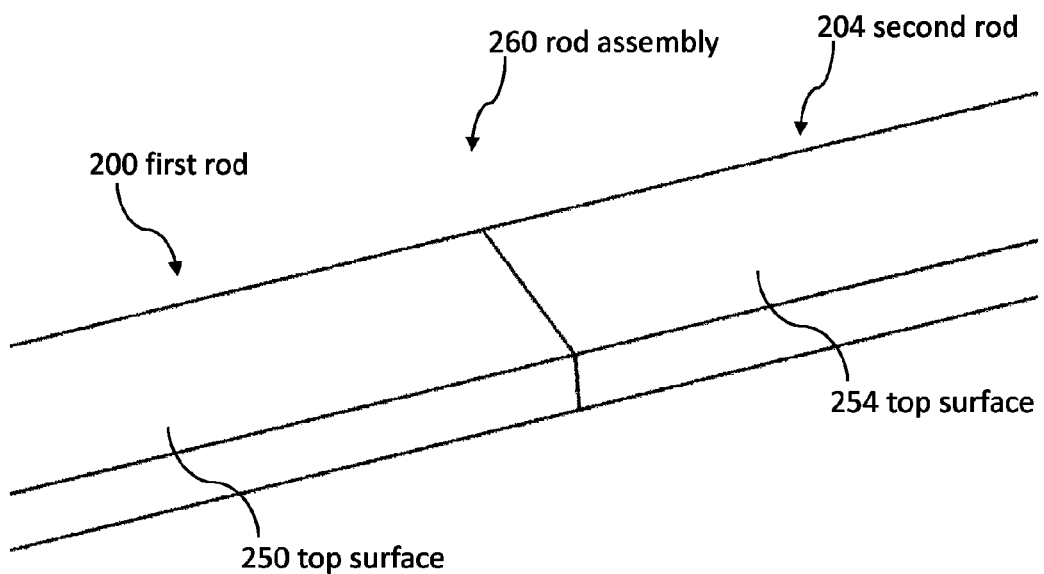

FIG. 19 illustrates a perspective view of the 200 first rod coupled to the second rod 204. In FIG. 19, the top surfaces 250, 254 of the first rod 200 and the second rod 204 are visible. The threaded inserts 102 are hidden underneath the rail assembly 260.

Figure 20:
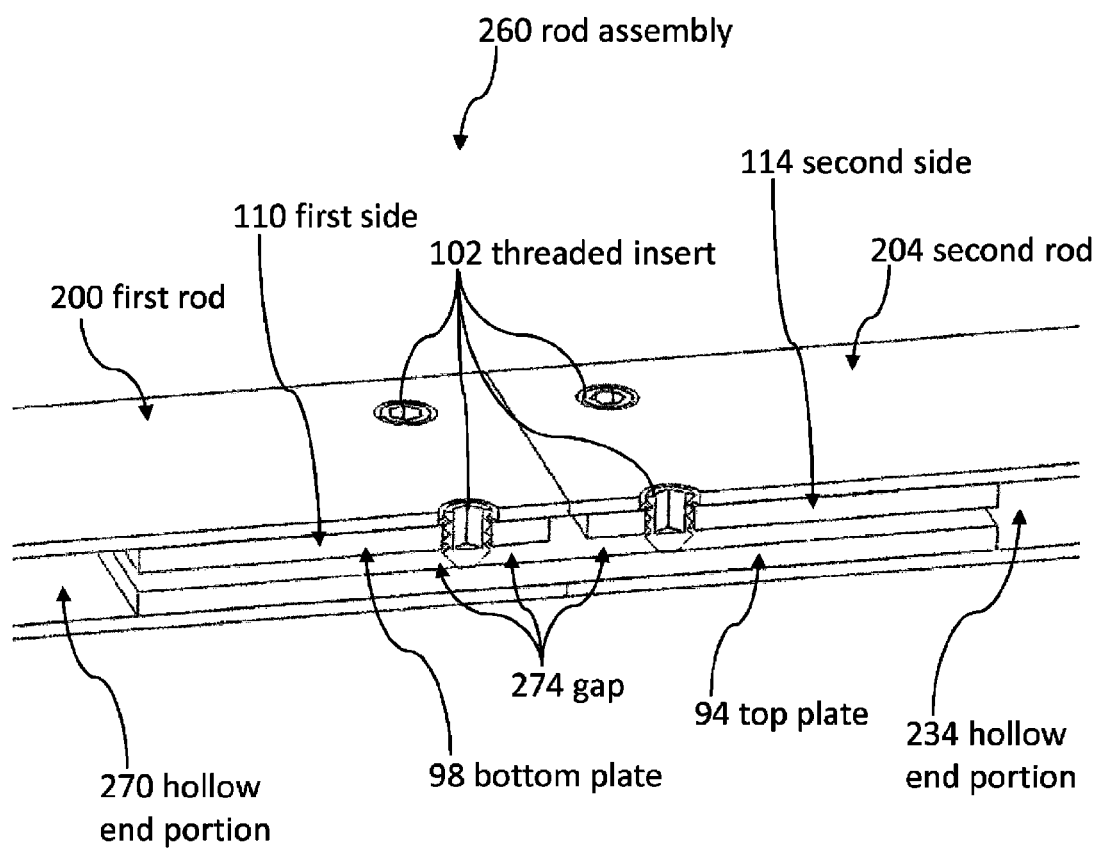
FIG. 20 illustrates a perspective view of a cross section taken along line 20-20 from FIG. 18, according to some embodiments.

FIG. 20 illustrates a perspective view of a cross section taken along line 20-20 from FIG. 18. The top plate 94 is located inside a hollow end portion 234 of the second rod and inside a hollow end portion 270 of the first rod 200. FIG. 20 illustrates four threaded inserts 102 although embodiments can include more or less threaded inserts 102. In some embodiments, a threaded insert 102 extends through at least a portion of a first hole (e.g., 212, 216, or 240 in FIG. 17) and is threadably coupled to a threaded hole of the first side 110 of the bottom plate 98. The threaded insert 102 can press the top plate 94 away from the bottom plate 98 inside of the hollow end portion 270 of the first rod 200. The threaded inserts 102 can create a gap 274 between the top plate 94 and the bottom plate 98.

Splice blocks and components of splice blocks can include diverse geometries. Not all splice blocks are rectangular.

Figure 21:
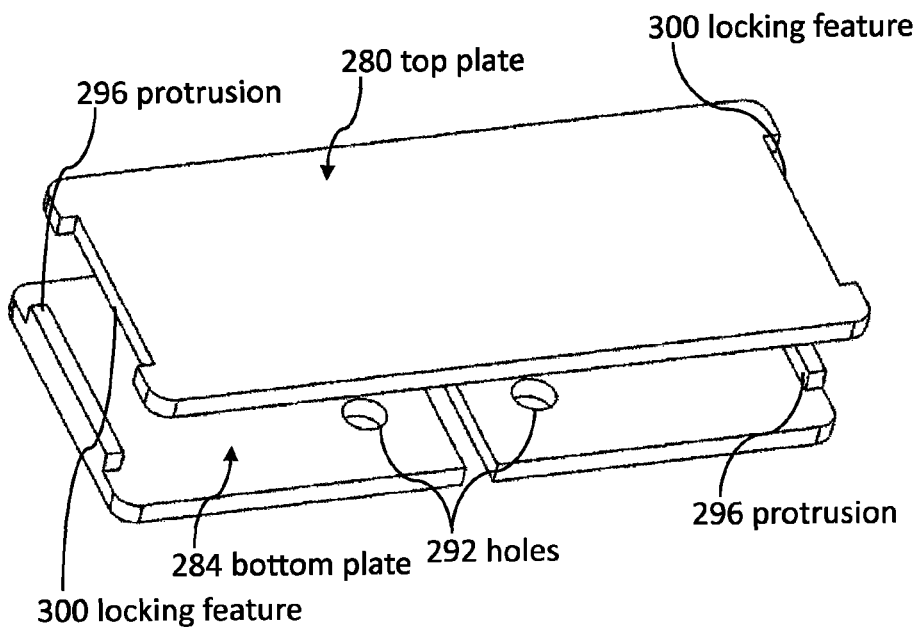
FIGS. 21 to 23 illustrate perspective views of a top plate and a bottom plate, according to some embodiments.
Figure 22:
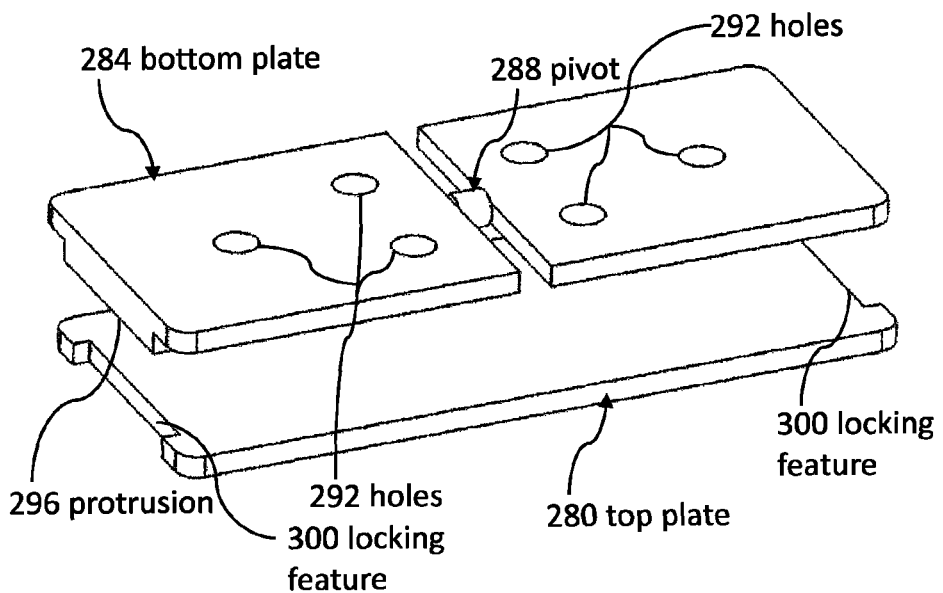
Figure 23:
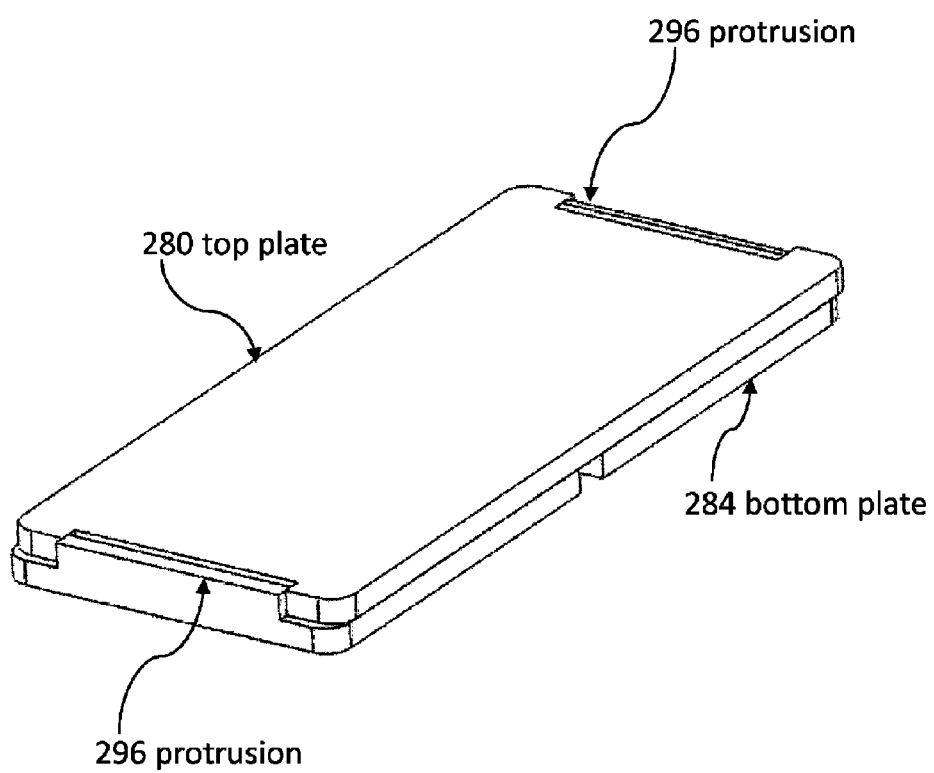

FIGS. 21 to 23 illustrate perspective views of a top plate 280 and a bottom plate 284. The bottom plate 284 can include two sides rotatably coupled by a pivot 288 configured to enable the first side to rotate relative to the second side.

The bottom plate 284 can include holes 292, which can be threaded holes. The bottom plate 284 can include protrusions 296 that extend towards the top plate 280. The top plate 280 can include locking features 300 configured to interlock with the protrusions 296. The locking features 300 can be holes, slots, grooves, and/or indentations.

Figure 24:
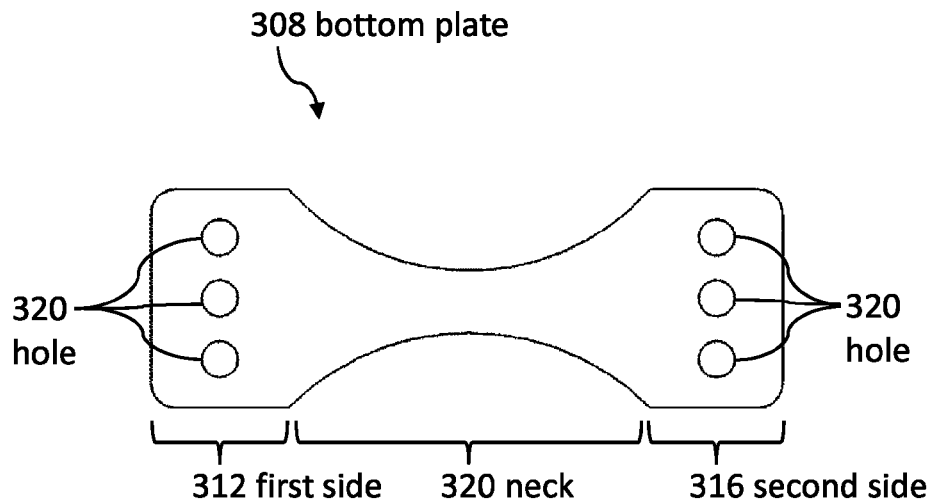
FIG. 24 illustrates a top view of a bottom plate with a first side coupled to a second side by a neck, according to some embodiments.
Figure 25:
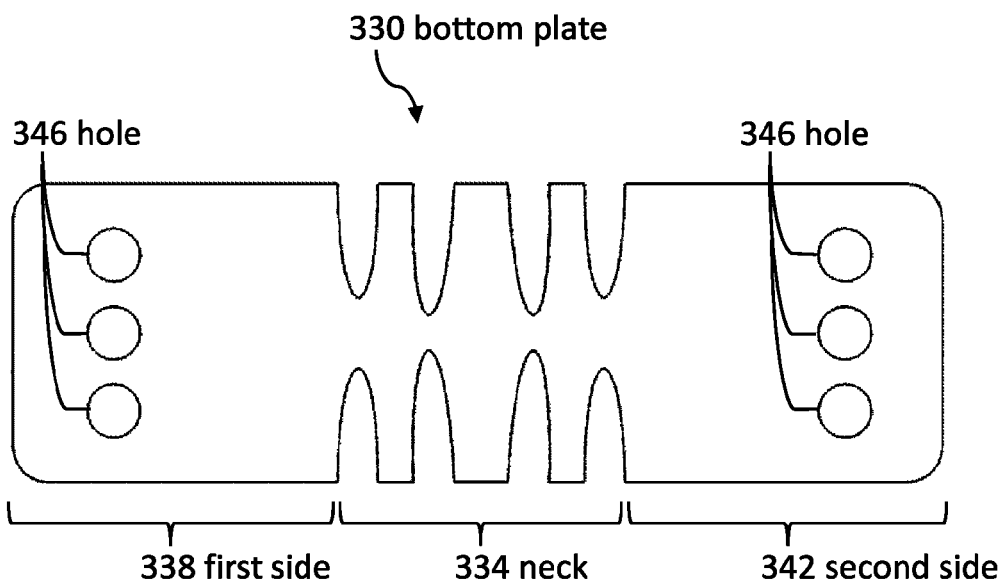
FIG. 25 illustrates a top view of a bottom plate that includes multiple notches to form a neck, according to some embodiments.

Bottom plates and necks of bottom plates can include diverse geometries. Some necks are much larger and/or are shaped very differently from the neck embodiments described above. FIG. 24 illustrates a top view of a relatively small bottom plate 308 with a first side 312 coupled to a second side 316 by a neck 320. Each side 312, 316 can include at least one hole 320, which can include a threaded sleeve. FIG. 25 illustrates a top view of a bottom plate 330 that includes multiple notches to form a neck 334. The neck 334 includes multiple bridging elements. The neck 334 couples a first side 338 to a second side 342 of the bottom plate 330. Each side can include holes 346, which can include threads configured to couple with threaded elements.

Splice blocks can be made from metal, rubber, and/or plastic. In some embodiments, top plates, bottom plates, and threaded inserts are made from stainless steel (e.g., grade 304, grade 316) or aluminum (e.g., 6061 aluminum alloy, 7075 aluminum alloy). Top plates, bottom plates, and threaded inserts can be machined. For example, a computer numerical control ("CNC") multi-axis mill can be used to machine the components. In several embodiments, top plates and bottom plates are molded from plastic or cast in metal. Rods can be extruded metal. Rods can be made from stainless steel (e.g., grade 304, grade 316) or aluminum (e.g., 6061 aluminum alloy, 7075 aluminum alloy). Extruded rods can be cut to a desired length. In some cases, rods can be made from plastic or wood.

The drawings are not necessarily to scale. The scale of some items in various drawings was altered in the interest of clarity.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The various features and processes described above may be used independently of one another, or may be combined in various ways. All possible combinations and subcombinations are intended to fall within the scope of this disclosure. In addition, certain method, event, state, or process blocks may be omitted in some implementations. The methods and processes described herein are also not limited to any particular sequence, and the blocks or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, act, operations and so forth.

The term "and/or" means that "and" applies to some embodiments and "or" applies to some embodiments. The term "and/or" is used as described here: A, B, and/or C means that some embodiments can include A and B, some embodiments can include A and C, some embodiments can include B and C, some embodiments can only include A, some embodiments can include only B, some embodiments can include only C, and some embodiments include A, B, and C. The term "and/or" is used to avoid unnecessary redundancy.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

While certain example embodiments have been described herein, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. An expandable splice block configured to mechanically couple a first rod to a second rod, the expandable splice block comprising:
   a top plate comprising a front surface and a back surface;
   a bottom plate comprising a first side and a second side, wherein the first side is coupled to the second side by a neck formed by at least two notches extending inward between the first side and the second side, wherein the neck is configured to deform to enable the first side to rotate at least three degrees relative to the second side, and wherein the first side comprises a first threaded hole and the second side comprises a second threaded hole;

a first threaded insert threadably coupled to the first threaded hole, wherein the first threaded insert is configured to push the top plate away from the first side as the first threaded insert is threaded towards the top plate;

a second threaded insert threadably coupled to the second threaded hole, wherein the second threaded insert is configured to push the top plate away from the second side as the second threaded insert is threaded towards the top plate; and a central axis extending between the first side and the second side of the bottom plate, wherein the central axis runs through at least a portion of the neck, wherein the first side comprises a third threaded hole and the second side comprises a fourth threaded hole, wherein a third threaded insert is threadably coupled to the third threaded hole and a fourth threaded insert is threadably coupled to the fourth threaded hole, wherein the first threaded hole of the first side and the second threaded hole of the second side are located on a left side of the central axis and the third threaded hole of the first side and the fourth threaded hole of the second side are located on a right side of the central axis to enable the threaded inserts to provide leverage relative to the central axis to force the neck to allow the first side to rotate relative to the second side when the first side is located inside of the first rod and the second side is located inside of the second rod.

2. The expandable splice block of claim 1, wherein the back surface of the top plate faces towards a first front surface of the first side of the bottom plate.

3. The expandable splice block of claim 1, wherein the first side comprises a first maximum width, the second side comprises a second maximum width, and the neck comprises a third maximum width, and wherein the first maximum width is more than four times as large as the third maximum width, and the first maximum width is within plus or minus 30% of the size of the second maximum width.

4. The expandable splice block of claim 1, wherein the first side comprises a first maximum width, the second side comprises a second maximum width, and the neck comprises a third maximum width, and wherein the first maximum width is more than ten times as large as the third maximum width, and the first maximum width is within plus or minus 10% of the size of the second maximum width.

5. The expandable splice block of claim 1, wherein the top plate comprises at least one protrusion and the bottom plate comprises at least one hole, and the protrusion extends from the top plate into the hole in the bottom plate to limit horizontal movement of the bottom plate relative to the top plate.

6. The expandable splice block of claim 1, wherein the bottom plate comprises at least one protrusion and the top plate comprises at least one hole, and the protrusion extends from the bottom plate into the hole in the top plate to limit horizontal movement of the bottom plate relative to the top plate.

7. The expandable splice block of claim 1, further comprising a first protrusion extending between the top plate and the first side of the bottom plate, and further comprising a second protrusion extending between the top plate and the second side of the bottom plate, wherein the first protrusion and the second protrusion form a movement control assembly configured to limit horizontal movement of the bottom plate relative to the top plate.

8. The expandable splice block of claim 1, wherein the top plate is substantially flat such that the front surface lies within a first set of two parallel planes 0.1 inches apart, the back surface lies within a second set of two parallel planes 0.1 inches apart, and the first set is parallel to the second set.

9. The expandable splice block of claim 8, wherein the first side of the bottom plate is substantially flat such that a first back surface of the first side lies within a third set of two parallel planes 0.1 inches apart, and the second side of the bottom plate is substantially flat such that a second back surface of the second side lies within a fourth set of two parallel planes 0.1 inches apart.

10. An expandable splice block system having a central axis with a left side and a right side, the system comprising:

a top plate;

a bottom plate comprising a first side and a second side, wherein the first side is coupled to the second side by a neck formed by at least two notches extending inward between the first side and the second side, wherein the neck is configured to deform to enable the first side to rotate at least three degrees relative to the second side, and wherein the central axis runs through at least a portion of the neck, wherein the first side comprises a first threaded hole located on the left side of the central axis and a second threaded hole located on the right side of the central axis, and wherein the second side comprises a third threaded hole located on the left side of the central axis and a fourth threaded hole located on the right side of the central axis;

a first rod comprising a first outer surface and a first hollow end portion, wherein the first outer surface comprises a first hole located on the left side of the central axis and a second hole located on the right side of the central axis, wherein the first hole and the second hole extend from the first outer surface into the first hollow end portion, wherein the first side of the bottom plate is located inside of the first hollow end portion of the first rod;

a second rod comprising a second outer surface and a second hollow end portion, wherein the second outer surface comprises a third hole located on the left side of the central axis and a fourth hole located on the right side of the central axis, wherein the first hole and the second hole extend from the second outer surface into the second hollow end portion, wherein the second side of the bottom plate is located inside of the second hollow end portion of the second rod;

a first threaded insert that extends through at least a portion of the first hole, is threadably coupled to the first threaded hole of the first side of the bottom plate, and presses the top plate away from the bottom plate inside of the first hollow end portion of the first rod;

a second threaded insert that extends through at least a portion of the second hole, is threadably coupled to the second threaded hole of the first side of the bottom plate, and presses the top plate away from the bottom plate inside of the first hollow end portion of the first rod;

a third threaded insert that extends through at least a portion of the third hole, is threadably coupled to the third threaded hole of the second side of the bottom plate, and presses the top plate away from the bottom plate inside of the second hollow end portion of the second rod; and a fourth threaded insert that extends through at least a portion of the fourth hole, is threadably coupled to the fourth threaded hole of the second side of the bottom plate, and presses the top plate away from the bottom plate inside of the second hollow end portion of the second rod.

11. The system of claim 10, wherein the first rod comprises a first top surface and a first bottom surface, and the second rod comprises a second top surface and a second bottom surface, wherein the first outer surface is the first bottom surface of the first rod and the second outer surface is the second bottom surface of the second rod, and wherein the system is configured to align the first top surface and the second top surface with the top plate while permitting the first side of the bottom plate to move relative to the second side of the bottom plate as the threaded inserts are tightened towards the top plate.

12. The system of claim 10, wherein the top plate and the bottom plate are hidden inside of the first hollow end portion and the second hollow end portion.

13. The system of claim 10, wherein the top plate comprises at least one protrusion and the bottom plate comprises at least one hole, and the protrusion extends from the top plate into the hole in the bottom plate to limit horizontal movement of the bottom plate relative to the top plate.

14. An expandable splice block configured to mechanically couple a first rod to a second rod, the expandable splice block comprising:
a top plate comprising a front surface and a back surface;
a bottom plate comprising a first side and a second side, wherein the first side is coupled to the second side by a neck formed by at least two notches extending inward between the first side and the second side;
a central axis extending between the first side and the second side of the bottom plate, wherein the neck is configured to deform to enable the first side to rotate at least three degrees relative to the second side, and the central axis runs through at least a portion of the neck, wherein a first threaded hole of the first side and a second threaded hole of the second side are located on a left side of the central axis, and a third threaded hole of the first side and a fourth threaded hole of the second side are located on a right side of the central axis; and
a first, a second, a third and a fourth threaded insert, each threaded insert threadably coupled to a respective one of the first, second, third and fourth threaded holes, wherein the first and third threaded inserts and the second and fourth threaded inserts are configured to push the to plate away from the first side and the second side, respectively, as the threaded inserts are threaded towards the top plate.

15. The expandable splice block of claim 14, wherein the top plate has a first maximum length and a first maximum width, wherein the bottom plate has a second maximum length and a second maximum width, and wherein the first maximum width is within plus or minus 10% of the second maximum width.

16. The expandable splice block of claim 15, wherein the first maximum length is within plus or minus 10% of the second maximum length.

17. The expandable splice block of claim 15, wherein the neck has a third maximum width and the third maximum width is less than 20% of the first maximum width.

18. The expandable splice block of claim 14, wherein the top plate is flat and rectangular, the first side is flat, and the second side is flat.

19. The expandable splice block of claim 14, wherein the back surface of the top plate faces towards a first front surface of the first side of the bottom plate, the top plate is flat, and the first side is located inside of the first rod and the second side is located inside of the second rod such that the threaded inserts provide leverage relative to the central axis to force the neck to allow the first side to rotate relative to the second side.

* * * * *